(12) United States Patent
Dearborn et al.

(10) Patent No.: US 12,054,923 B1
(45) Date of Patent: Aug. 6, 2024

(54) CONDENSER TYPE AIR TO WATER GENERATOR

(71) Applicants: Jeffrey Verne Dearborn, Davenport, FL (US); Karen M. Schwartz, Davenport, FL (US)

(72) Inventors: Jeffrey Verne Dearborn, Davenport, FL (US); Karen M. Schwartz, Davenport, FL (US)

( * ) Notice: Subject to any disclaimer, the term of this patent is extended or adjusted under 35 U.S.C. 154(b) by 0 days.

(21) Appl. No.: 18/535,325

(22) Filed: Dec. 11, 2023

(51) Int. Cl.
| | |
|---|---|
| *B01D 5/00* | (2006.01) |
| *B01D 53/26* | (2006.01) |
| *E03B 3/28* | (2006.01) |
| *F24F 3/14* | (2006.01) |
| *F24F 13/22* | (2006.01) |
| *F25D 21/14* | (2006.01) |
| *F28B 9/08* | (2006.01) |
| *F28F 17/00* | (2006.01) |
| *F28D 21/00* | (2006.01) |

(52) U.S. Cl.
CPC .............. *E03B 3/28* (2013.01); *B01D 5/0009* (2013.01); *B01D 53/265* (2013.01); *F24F 3/1405* (2013.01); *F24F 13/222* (2013.01); *F25D 21/14* (2013.01); *F28B 9/08* (2013.01); *F28F 17/005* (2013.01); *B01D 2257/80* (2013.01); *F24F 2003/1446* (2013.01); *F24F 13/22* (2013.01); *F28D 2021/0038* (2013.01)

(58) Field of Classification Search
CPC ........ F24F 3/1405; F24F 13/22; F24F 13/222; F24F 2003/1446; F25D 21/14; F25D 2021/0038; F28B 9/08; F28F 17/005; B01D 5/009; B01D 53/265

See application file for complete search history.

(56) References Cited

U.S. PATENT DOCUMENTS

| | | | |
|---|---|---|---|
| 2005/0284167 A1* | 12/2005 | Morgan ................ | F24F 13/222 62/272 |
| 2012/0125581 A1* | 5/2012 | Allen ..................... | H02S 20/00 156/291 |
| 2016/0317945 A1* | 11/2016 | West ..................... | B01D 53/002 |
| 2017/0307251 A1* | 10/2017 | Baruch ................. | F24F 13/082 |
| 2018/0266708 A1* | 9/2018 | Dulberg ................ | F24F 3/1405 |

* cited by examiner

*Primary Examiner* — Brian M King
(74) *Attorney, Agent, or Firm* — Dale J. Ream (57) ABSTRACT

An atmospheric water generation system includes a refrigeration assembly, a coolant reservoir, and an atmospheric water generator assembly in fluid communication with the coolant reservoir. The AWG includes an inlet for receiving ambient air and a plurality of tubing members each of which is in fluid communication with coolant generated by the coolant reservoir. The AWG includes a storage container commonly displaced from the plurality of tubing numbers and is configured to receive condensation that falls from the tubing members. Further, the AWG includes a plurality of photon diverters each positioned adjacent a downstream end of respective tubing member for recycling used coolant and directing a plurality of photons generated inside respective tubing members as a result of the condensation process.

20 Claims, 11 Drawing Sheets

CONDENSER TYPE AIR TO WATER GENERATOR

REFERENCE TO RELATED APPLICATIONS

This application is related to non-provisional patent application 63/417,995 filed Oct. 20, 2022 entitled An Unrestricted Condenser of an Air Water Generator, and which is incorporated in its entirety in the present application.

BACKGROUND OF THE INVENTION

This invention relates generally to an air to water generator (AWG) and, more particularly, to an AWG that condenses water from air using acoustic wave enhancement and while collecting photon energy.

Using appropriate technology, water may be harvested from ambient air. In other words, a machine referred to as an air water generator or an atmospheric water generator (AWG) may be configured to extract water droplets out of the air. More particularly, ambient air may be drawn into a container and supercooled using coolant such that water droplets condense and fall downwardly through forces of gravity where it may be collected and harvested for use. In other words, an atmospheric water generator utilizes the untapped potential of ambient air to generate clean and potable water using a supercooled condensation process. In some embodiments and, particularly, in cooler climates, AWG's experience lower condensation rates and, as a result, become energy intensive and less efficient.

Therefore, it would be desirable to have an air water generator properly configured to pull ambient air into a condensation chamber in the presence of a plurality of coolant tubes that induce condensation of water from the collected ambient air such that water droplets may be collected for use as part of water or other streaming purposes. Further, it would be desirable to have an AWG that utilizes acoustic frequency technology to increase the condensation rate associated with collecting water. In addition, it would be desirable to have an AWG configured to collect and divert photon energy generated during the condensation process.

SUMMARY OF THE INVENTION

An atmospheric water generation system includes a refrigeration assembly, a coolant reservoir, and an atmospheric water generator assembly in fluid communication with the coolant reservoir. The AWG includes an inlet for receiving ambient air and a plurality of tubing members each of which is in fluid communication with coolant generated by the coolant reservoir. The AWG includes a storage container commonly displaced from the plurality of tubing numbers and is configured to receive condensation that falls from the tubing members. Further, the AWG includes a plurality of photon diverters each positioned adjacent a downstream end of respective tubing member for directing a plurality of photons generated inside respective tubing members as a result of the condensation process.

Therefore, a general object of this invention is to provide an atmospheric water generator for collecting potable water generated through condensation of water from ambient air drawn into a supercooled environment.

Another object of this invention is to provide an AWG, as aforesaid, for increasing a condensation rate by directing vibratory waves across a plurality of condensation tubes so as to dislodge water droplets therefrom.

Still another object of this invention is to provide an AWG, as aforesaid, that directs photons generated inside the plurality of condensation tubes downstream through a respective lens.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a side view of the coolant reservoir as in FIG. 2a;

FIG. 4 is an exploded view of the atmospheric water generator assembly as in FIG. 3a;

FIG. 6b is a sectional view taken along line 6b-6b of FIG. 6a;

FIG. 7b is a sectional view taken along line 7b-7b of FIG. 7a;

FIG. 8b is a side of the diverter assembly as in FIG. 8a;

FIG. 9b is a side view of the diverter assembly as in FIG. 9a; and

DESCRIPTION OF THE PREFERRED EMBODIMENT

Figure 1A:
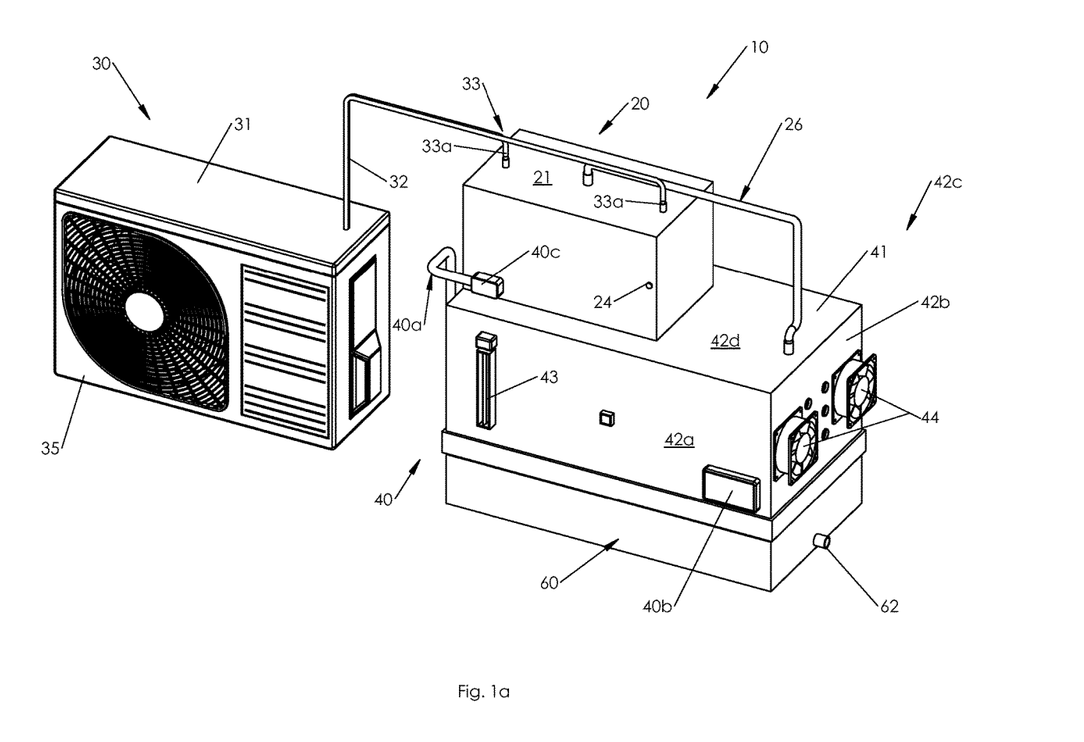
FIG. 1a is a perspective view of an atmospheric water generator apparatus according to a preferred embodiment of the present invention.

An atmospheric water generation apparatus (AWG) according to a preferred embodiment of the present invention will now be described with reference to the accompanying drawings. The atmospheric water generation apparatus 10 includes a refrigeration assembly 30, a coolant reservoir 20, an atmospheric generator assembly 40, a water collection reservoir 60, and an acoustic device 70. The overall apparatus 10 is shown in FIG. 1.

Certain general principles of physics and chemistry will be described for later reference in describing the present invention.

In the simplest of terms, the air includes water vapor, although most of the time we cannot see it. Condensation is the process by which water vapor in the air is changed into liquid water; it's the opposite of evaporation. Water molecules in the vapor form are arranged more randomly than in liquid water. As condensation occurs and liquid water forms from the vapor, the water molecules become more organized, and heat is released into the atmosphere as a result.

Stated another way, condensation describes the change of water in a gaseous state transforming into a liquid state, such as through a cooling process. During the process of condensation, water releases energy in the form of a plurality of photons. This energy must be absorbed by the environment where condensation is occurring.

A photon, by definition, is a tiny particle that comprises waves of electromagnetic radiation. Specifically, the plurality of photons is the form of energy that is generated during the process of condensation and are the energy packets that must be absorbed into the environment. The present invention describes a specific structure for collecting and directing this plurality of photons and describes how they are separated from the stream of coolant, such as via the diverter assemblies extending through the outlet manifold.

In the present instance, the plurality of photons generated inside the channel defined by respective condensation tubes and are directed downstream with the downstream flow of coolant. And, more particularly, the coolant and plurality of photons travel downstream to the diverter members where coolant is directed or returned back to the coolant reservoir whilst the plurality of photons are directed through the lens of a respective diverter assembly as will be explained in more detail later.

With more specific reference now to FIG. 1, the inventive apparatus 10 includes a refrigeration assembly 30, also referred to as a chiller, having a traditional construction and configuration for generating and supplying coolant to the coolant reservoir 20. More particularly, the refrigeration assembly 30 may include a casing 31 having a plurality of walls arranged in a generally box shaped configuration that defines an interior space configured to contain traditional refrigeration components configured to generate a supercooled liquid to be pumped to the coolant reservoir 20 through a conduit 32. It is understood that the conduit 32 may include or be connected and in fluid communication with a coolant supply manifold 33 configured to interface with the coolant reservoir 20. As shown, the coolant supply manifold 33 may include multiple and spaced apart piping portions 33a adjacent a top wall 21 of the coolant reservoir 20 so as to more effectively distribute and cool the coolant contained therein. Further, the refrigeration assembly 30 may include a fan 35 for drawing ambient air into the interior space and may include a compressor (not shown) or other refrigeration hardware for compressing the incoming ambient air into a supercooled liquid state that is then transferred to the coolant reservoir 20 via the conduit 32 and coolant supply manifold 33.

Preferably, the coolant referred to herein is water although the coolant may include additives such as antifreeze, especially if freezing is a concern. Further, fluorocarbons such as chlorofluorocarbons, ammonia, sulfur dioxide and non-halogenated hydrocarbons (for example, propane) may be used as refrigerants. In addition, Freon is a registered tradename by DuPont that refers to a large number of carbon compounds often use as refrigerants.

Figure 2A:
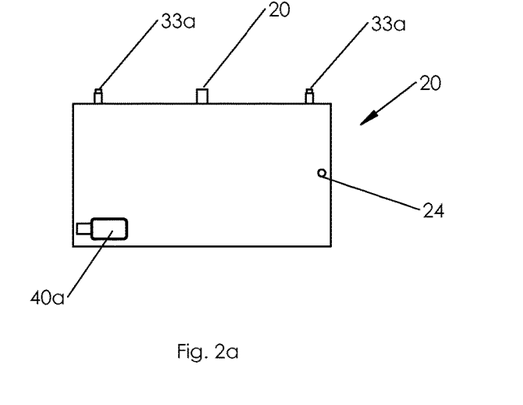
FIG. 2a is a front view of the coolant reservoir removed from the apparatus as in FIG. 1a for clarity.
Figure 2B:
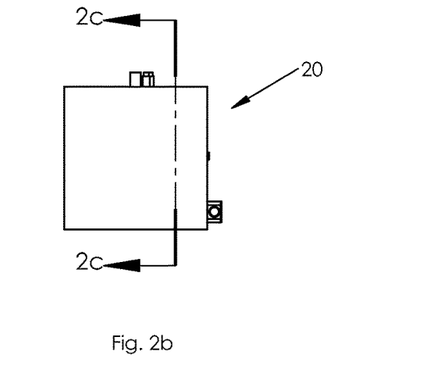
Figure 2C:
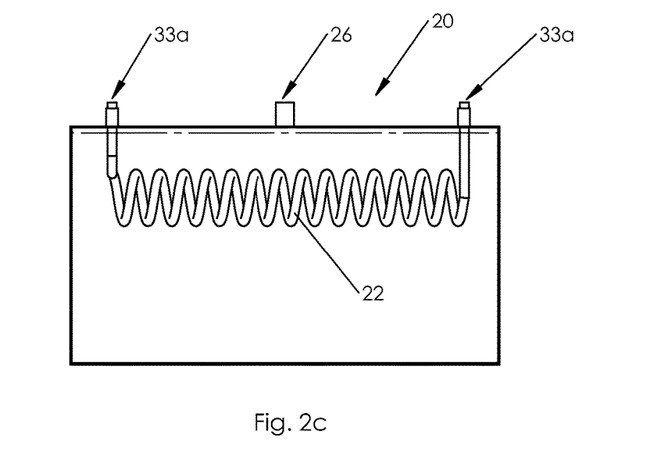
FIG. 2c is a sectional view taken along line 2c-2c of FIG. 2b.

Preferably, the coolant reservoir 20 includes a coil 22 in fluid communication with the coolant supply manifold 33 such that the supercooled coolant liquid from the refrigeration assembly 30 cools the volume of coolant as it flows through the coolant in due course (FIG. 2). In an embodiment, the coolant reservoir may have a bottom, a top, and a plurality of sidewalls arranged in a box-like container defining an interior area configured to receive coolant from the refrigeration assembly 30 and also from the atmosphere water generator assembly 40 as will be described later (i.e., a return conduit 26). In other words, the coolant reservoir 20 may be completely or almost completely filled with coolant such that the coolant surrounds the coil 22. The coil 22 and coolant supply manifold 33 may also be configured to cycle the supercooled coolant liquid through the coils 22 of the coolant reservoir 20 repeatedly or may be replenished by supercooled coolant liquid from the refrigeration conduit 32 in that the coolant in the coils 22 will naturally be warmed by the volume of coolant in the coolant reservoir 20. In an embodiment, the coolant reservoir 20 may include a temperature sensor 24 that may be in electrical communication with a controller or with the refrigeration assembly 30 so as to regulate when additional coolant may be required to maintain a predetermined coolant temperature within the coolant reservoir 20. In addition, the coolant reservoir 20 may include an outlet in communication with a coolant pump 40c configured for pumping coolant from the coolant reservoir 20 into the atmosphere water generator assembly 40 which will be described below. Still further, a return conduit 26 interconnects an outlet manifold 47 of the atmosphere water generator assembly 40 with the coolant reservoir 20 such that coolant used in the condensation process may be recycled and used again as will be described later in more detail.

In a critical aspect, the present invention includes an atmosphere water generator assembly 40 (also referred to as an air water generator) that is in fluid communication with the coolant reservoir 20 and is configured to induce condensation of ambient air into liquid and potable water which may then be collected for use such as in a municipal water system, industrial water system, private water use, or the like.

Figure 5:
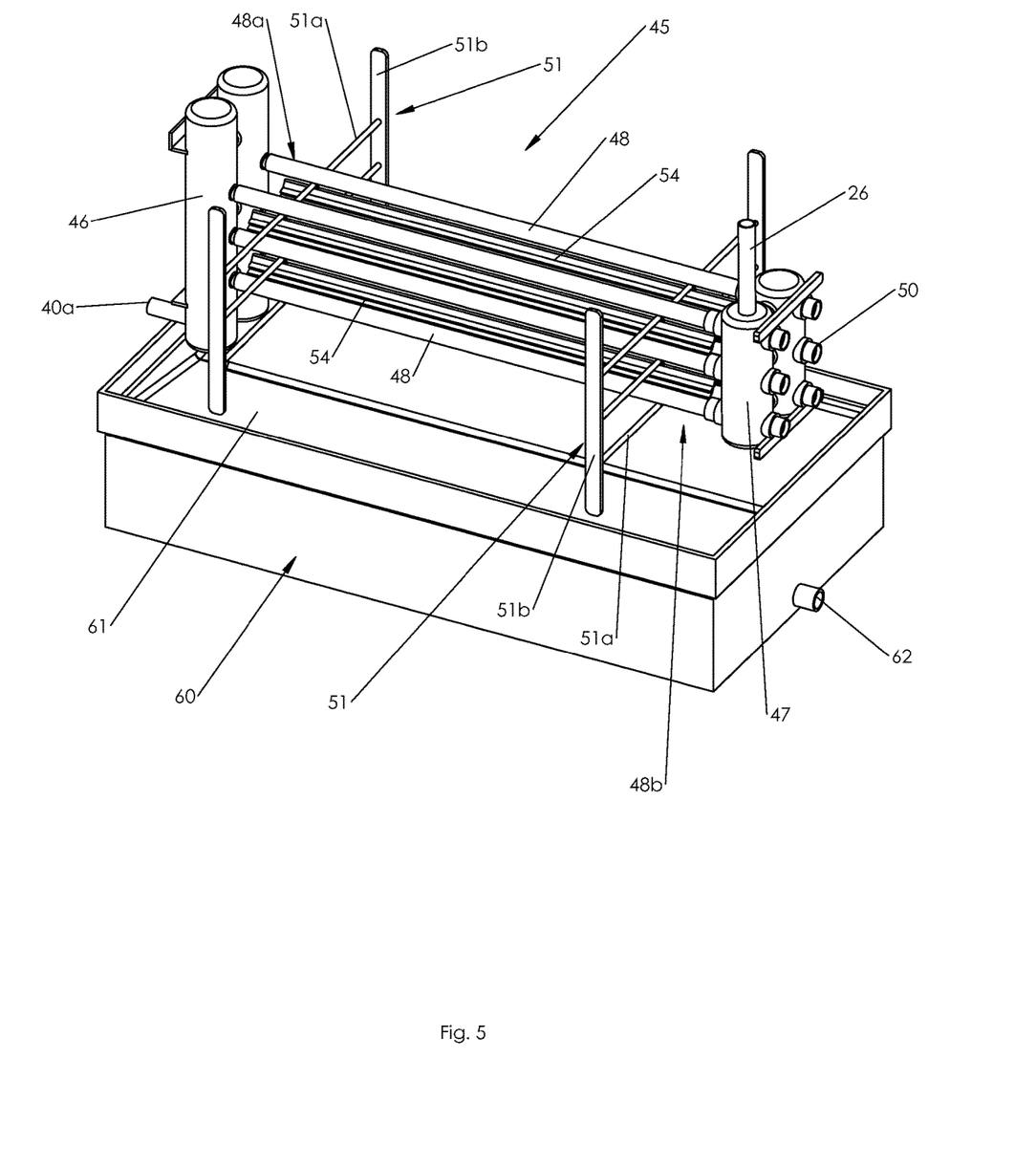
FIG. 5 is a perspective view of the atmospheric water generator assembly as in FIG. 4, illustrated with the housing removed for the sake of clarity.
Figure 6A:
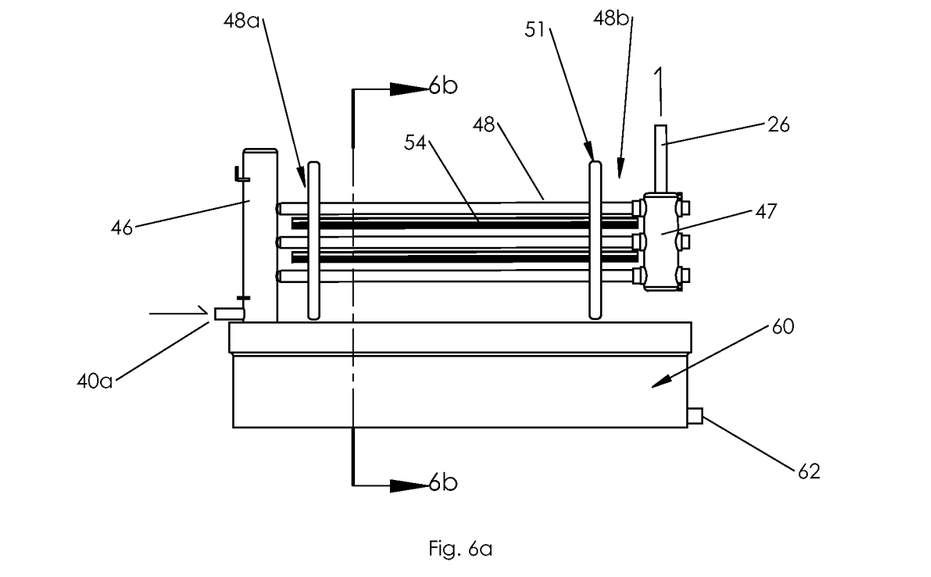
FIG. 6a is a side view of the atmospheric water generator assembly as in FIG. 5.
Figure 6B:
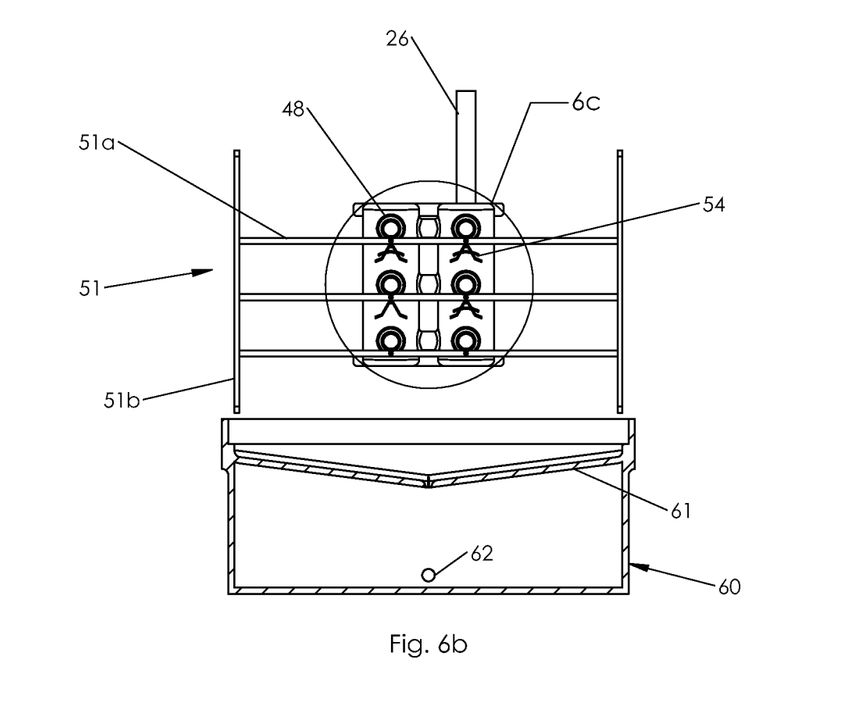
Figure 6C:
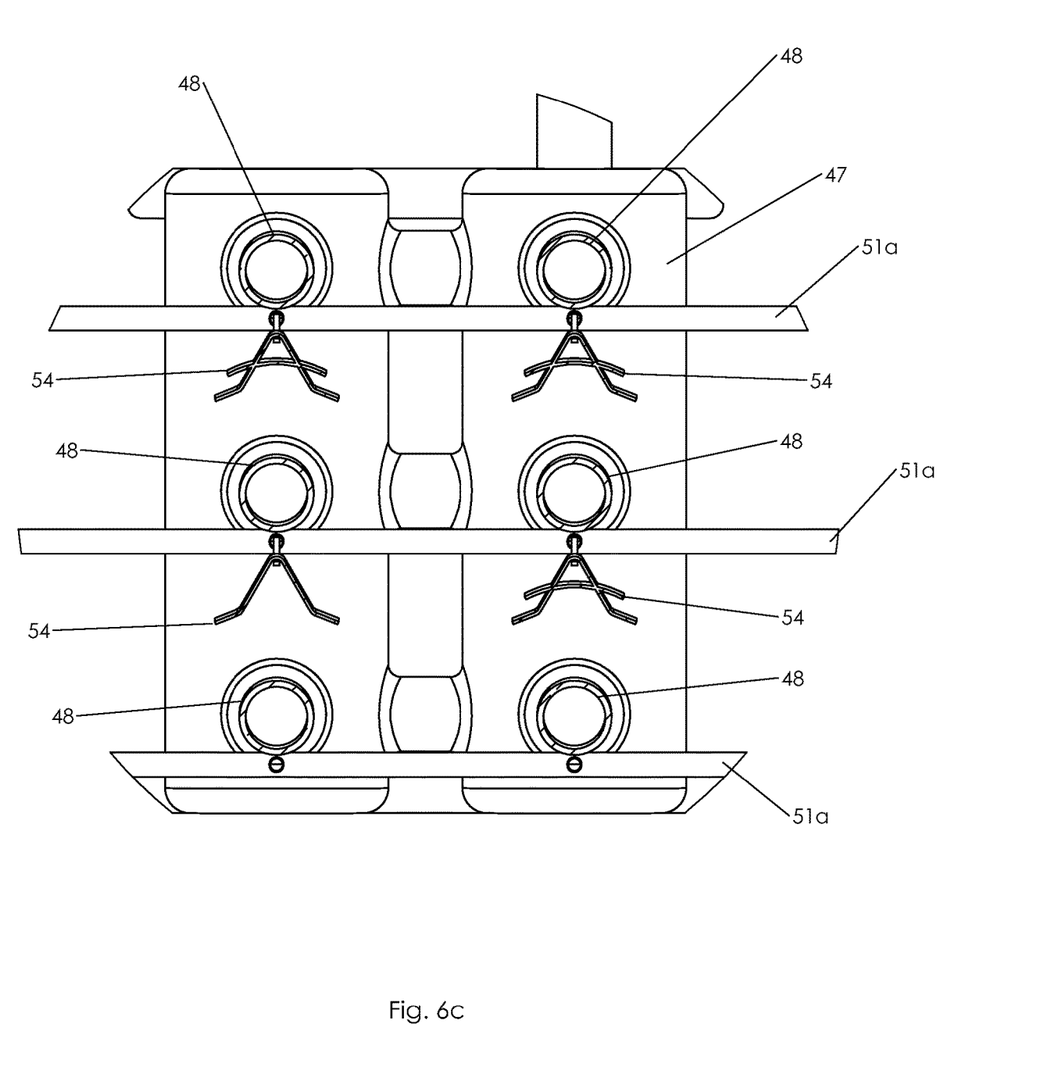
FIG. 6c is an isolated view on an enlarged scale taken from FIG. 6b.

As shown particularly in FIG. 5, the atmosphere water generator assembly 40 may include a housing 41 having front wall 42a, a back wall, left and right-side walls 42b, 42c, and a top wall 42d that, together, define an interior area in which other critical components are positioned and defining an open bottom. In an embodiment, at least the front wall 42a (and possibly other walls) may include an intake butterfly vent 43 configured to receive ambient air into the interior area of the housing 41. Further, at least the right-side wall 42c may include at least one pull fan 44 that is configured and operable to pull air through the vent 43 and across the interior area of the housing 41 through apertures defined by the pull fan 44. To be specific, two pull fans 44 are preferred and each one pulls air through the housing 41 as opposed to pushing air therethrough. As will be seen below, water droplets are condensed out of the atmospheric air drawn into the interior area of the housing 41 when the fans are energized. The air water generator 40 may include an electronics box 40b having components for controlling the fans 44, coolant distribution, and the like.

Figure 3A:
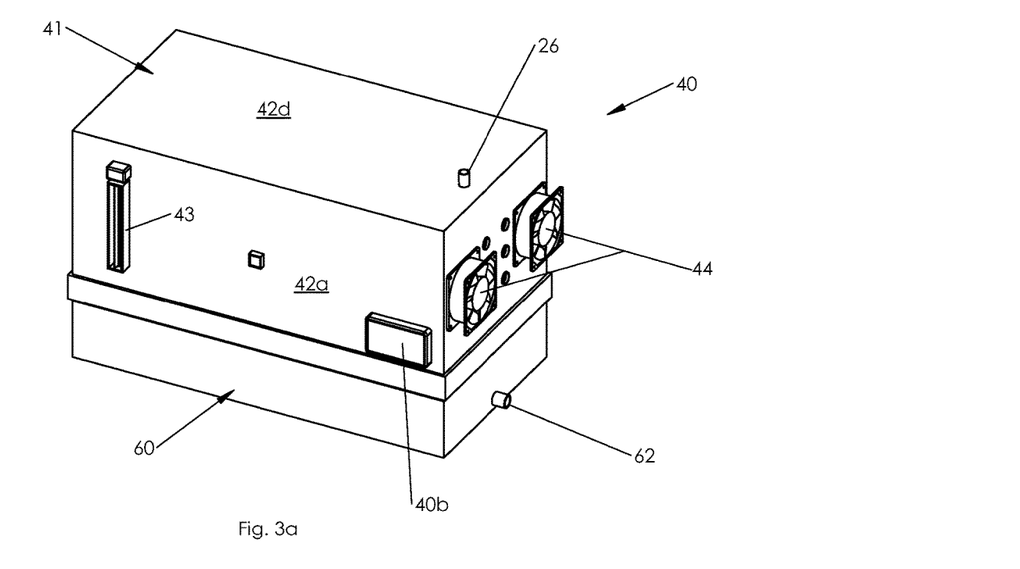
FIG. 3a is a perspective view taken from a right-side angle of the atmosphere water generator assembly removed from the apparatus as in FIG. 1a for clarity.
Figure 3B:
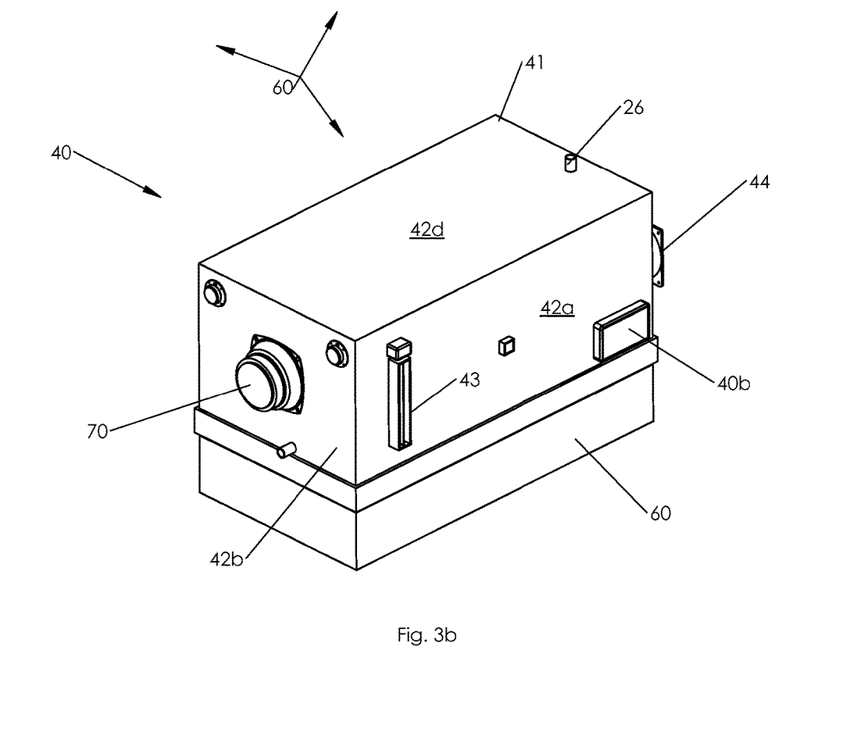
FIG. 3b is a perspective view taken from a left-side angle of the atmospheric water generator assembly removed from the apparatus as in FIG. 1a for clarity.
Figure 4:
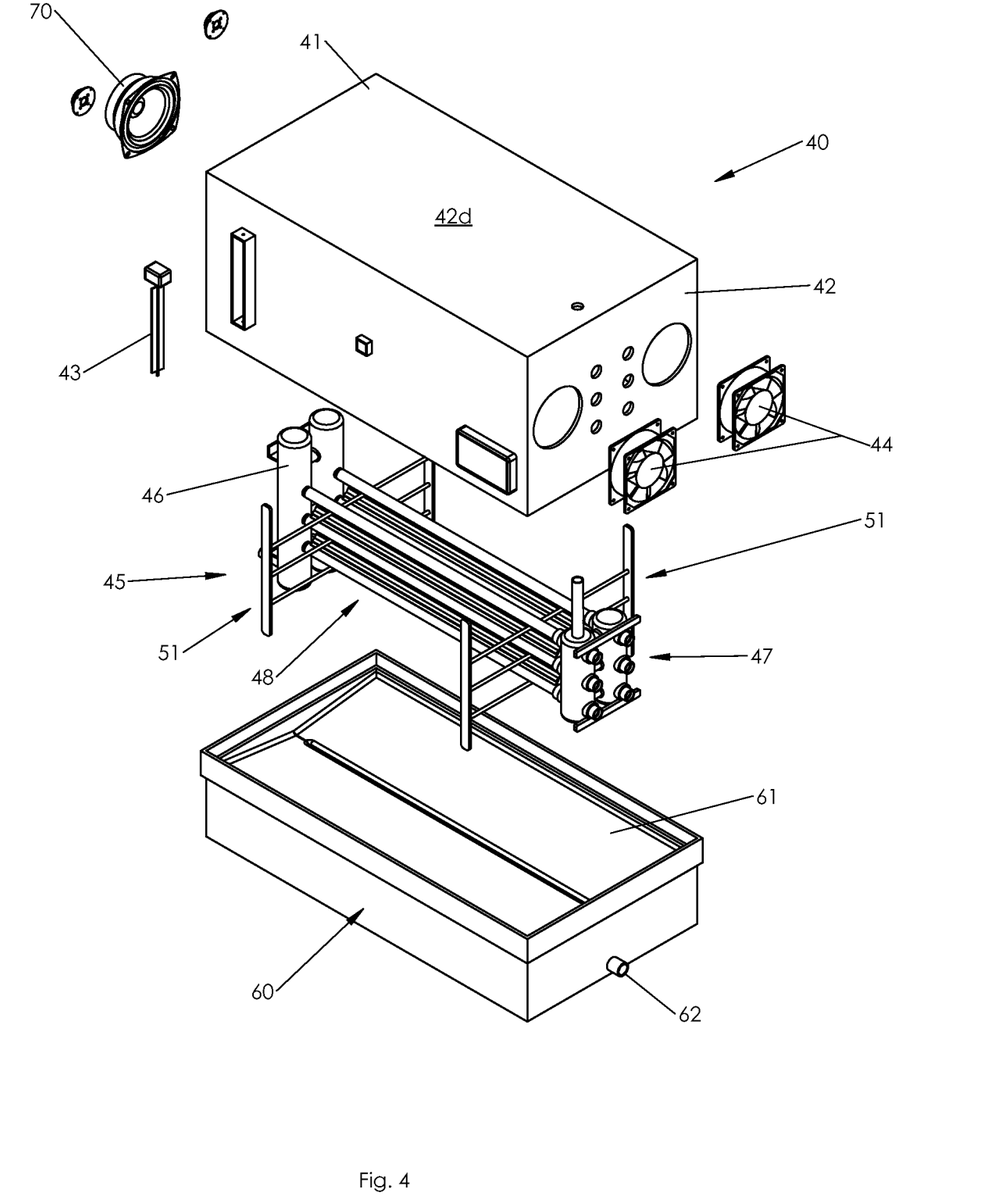

Further, the air water generator 40 includes a condensation assembly 45 having at least one inlet manifold 46 having an upstanding and tubular configuration, the inlet manifold 46 being in fluid communication with coolant reservoir 20 via a coolant connector conduit 40a (FIGS. 1 and 3). Further, the condensation assembly 45 includes at least one outlet manifold 47 displaced laterally from the inlet manifold 46. In other words, the condensation assembly 45 includes inlet and outlet manifolds 46, 47, respectively, positioned at opposite ends of the interior area defined by the housing 41 (FIGS. 4 and 5). Further, the condensation assembly 45 includes a plurality of condensation tubes 48 each extending between the inlet and outlet manifolds 46, 47. Each condensation tube 48 includes a proximal end 48a that is open and in fluid communication with the coolant connector conduit 40a and has a tubular configuration such that coolant is pumped and in fluid flow downstream therein. Further, each condensation tube 48 extends through a body portion of the outlet manifold 47 to a distal end 48b positioned slightly downstream of the outlet manifold 47. Preferably, the distal end 48b includes a lens 49 that is closed and is a stop to downstream flowing coolant as will be described further later.

The condensation methodology can be described in further detail with regard to the structures identified above. For the air water generator, the liquid water coolant flows (i.e., is pumped) from the Chiller assembly to the intake manifolds 46. The condensation tubes 48 receive their liquid water coolant from the intake manifold 46. Inside the air water generator housing (in a commercial setting a one-acre building 30 feet tall with miles upon miles of non-metal tubing) is where the condensation tubes 48 cool the air to below the Dew Point temperature. The incoming ambient air begins to release photon packets of energy any time the air shrinks and cannot physically hold the energy according to the laws of electrons and molecular physics. When the energy leaves the water vapor then the water vapor turns into tiny droplets. The direction that the energy travels is governed by the location of the lowest energy level (lowest temperature). That location is inside the condensation tubes 48. The exterior of the condensing tubes is probably a fraction of a degree warmer than the liquid coolant inside, therefore the Photon (energy) proceeds. However, as it passes through the nonmetal tubing, Refraction governs the bent path that the photon follows.

The fans 35 are configured to pull the air from the exterior through the building to eliminate the energy of pushing that could be added to the air by the fans 35. Of course, filters for bugs and other such debris are mandatory.

As described, the photons follow the direction and path of the liquid water coolant according to the phenomena of Total Internal Reflectance, in a manner substantially similar to as Fiber Optics.

Figure 9A:
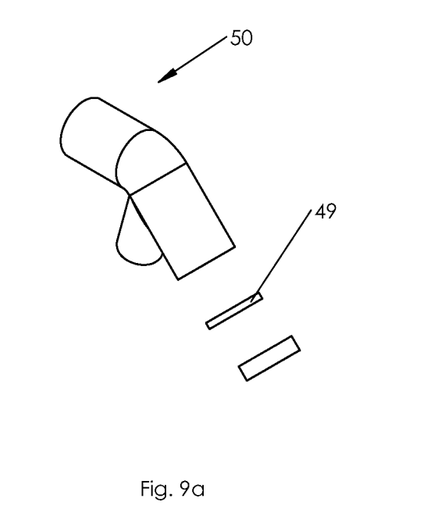
FIG. 9a is a perspective view of a vibrator assembly according to another embodiment of the present invention.
Figure 9B:
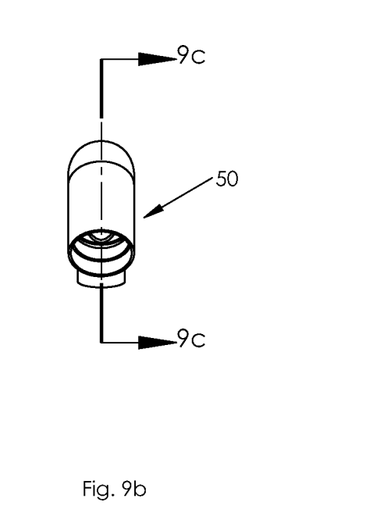

With specific reference to FIG. 9b, each condensation tube 48 may include a diverter assembly 50 each having a tubular configuration coupled to a distal end 48b of a condensation tube 48, each diverter assembly 50 essentially functioning as an extension of the respective condensation tube 48 to which it is coupled. In this embodiment, each diverter assembly 50 has a linear configuration and essentially extends through the interior space defined by the outlet manifold 47. More particularly, each diverter assembly 50 defines an upper aperture 50a in communication with the interior space defined by the outlet manifold 47 such that coolant flowing through a respective condensation tube 48 must make a 90° turn and flow upwardly through the outlet manifold 47 and eventually into the coolant return conduit 26 such that coolant is returned to the coolant reservoir 20 as described earlier. Further, it is reiterated that a distal end 48b includes a lens 49 and is, therefore, closed as a stop such that coolant is required to flow upwardly and said outlet manifold 47 and return to the coolant reservoir 20.

Figure 7A:
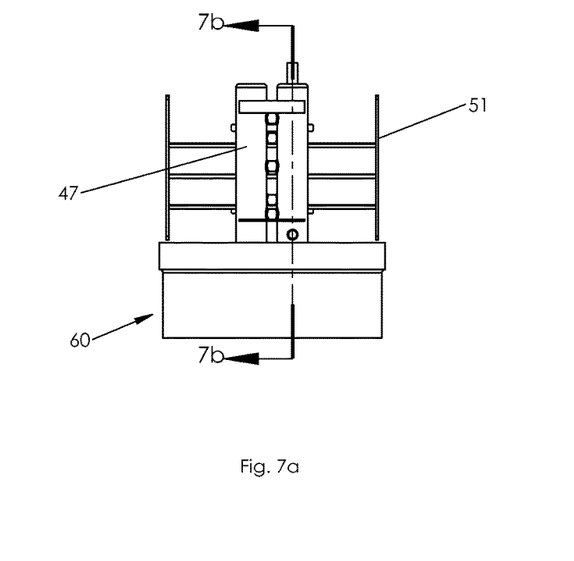
FIG. 7a is a side view of the atmospheric water generator assembly as in FIG. 5.
Figure 7B:
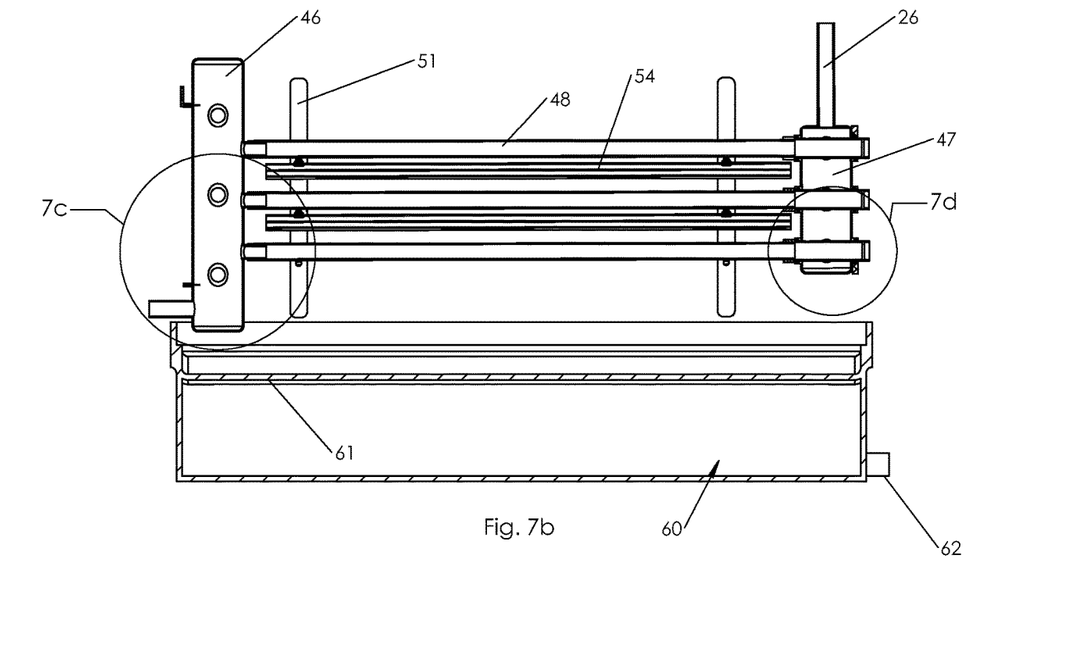
Figure 7C:
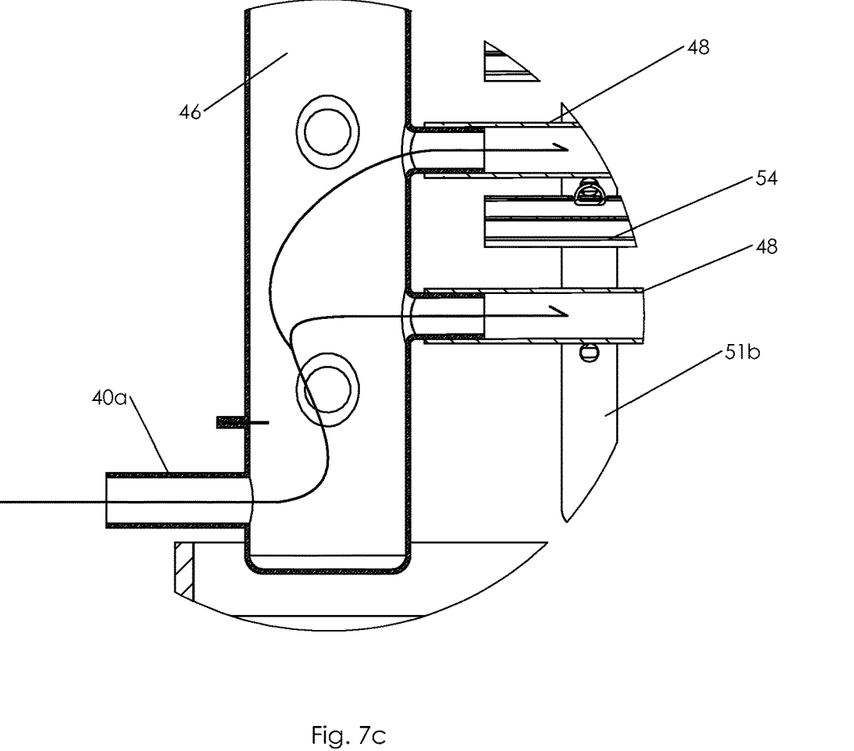
FIG. 7c is an isolated view on an enlarged scale taken from FIG. 7b.
Figure 7D:
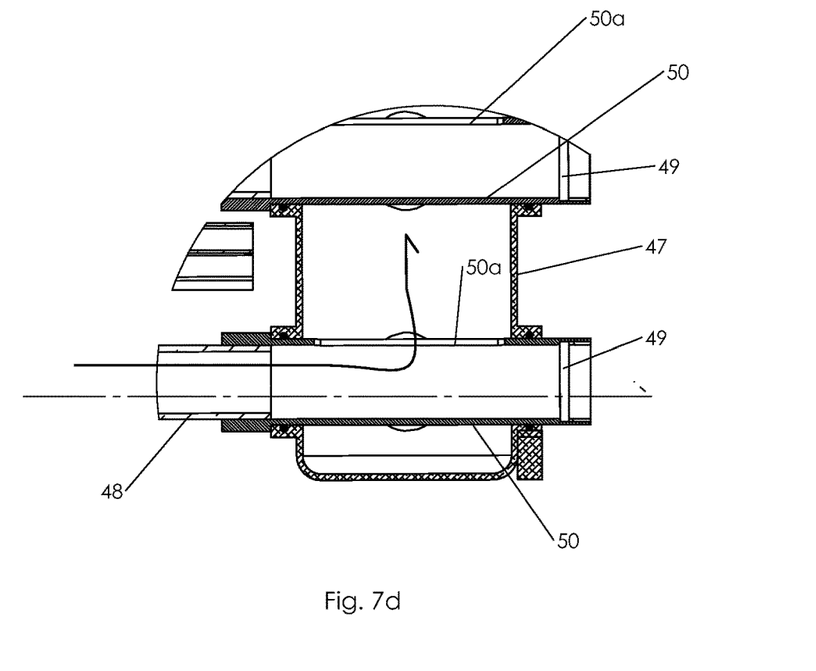
FIG. 7d is an isolated view on an enlarged scale taken from FIG. 7b.
Figure 8A:
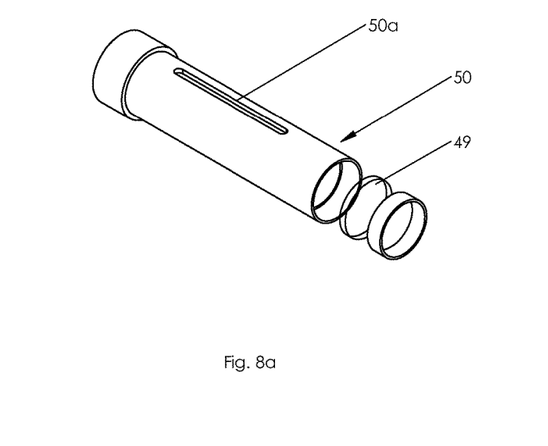
FIG. 8a is a perspective view of a diverter assembly, illustrated removed from the condensation assembly as in FIG. 5.
Figure 8B:
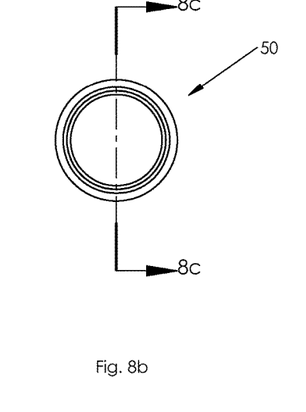
Figure 8C:
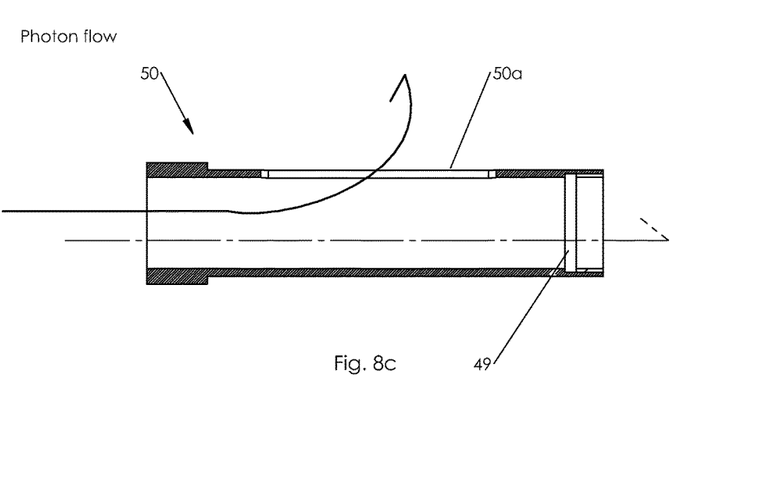
FIG. 8c is a sectional view taken along line 8c-8c of FIG. 8b.

With further reference to the condensation process, a plurality of photons is the form of energy that is generated during the process of condensation and are energy packets that must be absorbed into the environment. Specifically, the plurality of photons is generated in the condensation process and is moved downstream therein with the coolant. Even more particularly, there is a coolant pathway and a photon pathway flowing downstream toward the diverter assemblies 50 (FIGS. 7d an 8c) and distal end 48b where coolant is directed or returned back to the coolant reservoir whilst the plurality of photons is directed through the lens 49.

Figure 9C:
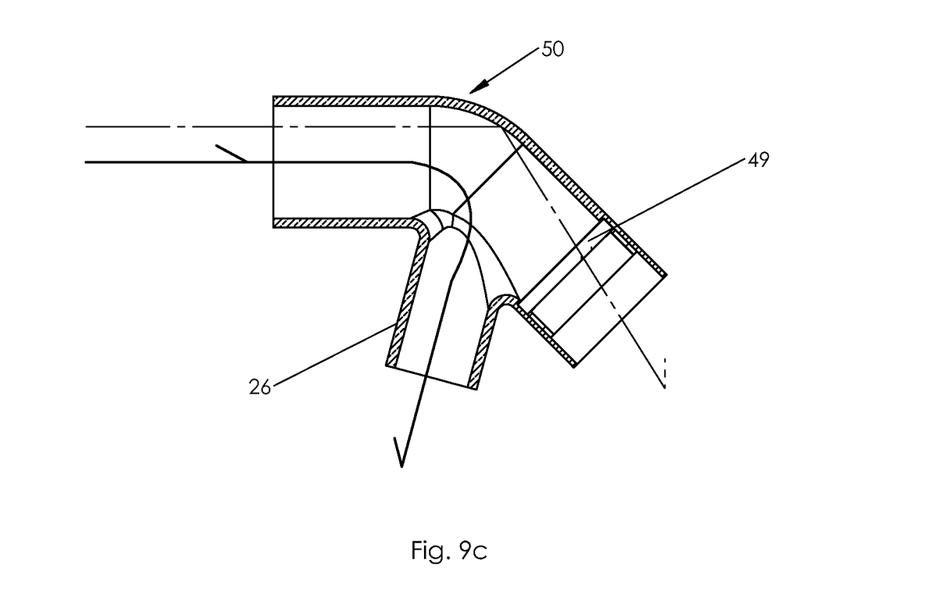
FIG. 9c is a sectional view taken along line 9c-9c of FIG. 9b.

Another embodiment of the diverter assemblies 50 is shown in FIGS. 9a through 9c. Specifically, each diverter assembly 50 may have an offset or angled configuration such that the photon pathway as indicated by the dashed line will essentially deflect at the angled distal end of a photon assembly 50 but will otherwise still be reflected through lens 49 whilst the coolant is directed via return conduit 26 back to the coolant reservoir 20 as described earlier.

Preferably, each condensation tube 48 is constructed of a non-metal material that is transparent, such as glass or a transparent plastic material. Specifically, a PVC pipe material is preferred for the tubing 48. One reason for such a construction is that a plurality of photons will be directed downstream within the interior of the condensation tubes 48 in a manner similar to that of fiber-optic cables according to the total internal refraction (TIR) principal where the connectivity of a metal construction would be undesirable. Specifically, it is understood that the photons will bounce around inside the tubing. If metal tubing was utilized, the photon would hit the metal and slow down significantly. It is noted that the atmosphere water generators of the prior art that include metal tubing actually subvert movement of photons, and in fact, causing a photon to stop and surrender its energy to an electron on the surface of the metal. This transfer of energy causes warming (heat) which travels slowly through copper and heat travels slowly through copper.

By contrast, non-metal tubing is critical to the construction according to the present method as it does not cause the significant slowing and enables the entire condensation process described herein to occur faster than with metal tubing. In addition, interior surfaces of the non-metal tubing may be coated with reflective materials that contribute to efficient photon delivery and, therefore, increase speed. Further, photons are not surrendered to electrons on a metal surface and, thus, heat conduction is reduced and slowing is avoided. Cost is also an important factor in that PVC is between five and 14 times less expensive than copper tubing. As shown in FIGS. 4 and 5, the plurality of condensation tubes 48 may be arranged in a stacked configuration.

With further reference to FIGS. 4 and 5, the condensation assembly 45 includes a water collection reservoir 60, which may also be referred to as a water collection pan or water collection tank. The water collection pan 60 includes an open interior area capable of receiving and holding a predetermined volume of water having been condensed onto respective of the plurality of condensation tubes 48, said condensation having fallen into the collection tank 60. Further, the water collection tank 60 may include a lid 61 having one or more lid panels that are inclined inwardly toward an aperture or in fluid communication with the open interior area such that falling water droplets are directed into the interior area. The collection area of the water collection tank 60 includes an outlet 62 at which collected water may be extracted or allowed to flow downstream for use in a potable water application or other industrial or residential use. Similarly, the outlet 62 may be configured as a spigot to which may be attached a hose or to be accessed immediately by a user.

Further, the condensation assembly 45 includes at least a pair of support frames 51 preferably positioned inwardly adjacent the inlet and outlet manifolds 46, 47. Each support frame 51 including a plurality of support rods 51*a* extending between upstanding support legs 51*b*. It is understood that the support rods 51*a* may also be referred to as support arms that extend laterally beneath each condensation tube 48 so as to support respective tubes against sagging or breakage. It is understood that additional support frames may be included and spaced apart intervals longitudinally along the condensation tubes 48.

Because the plurality of condensation tubes 48 may be positioned in a stacked configuration, there is a concern that condensation, when weighing heavy on upper tubes 48, will fall onto lower condensation tubes 48 and potentially damage them or provide inefficient water collection. Accordingly, the condensation assembly 45 may include a plurality of shield members 54 (also referred to as caps or shields) each having a configuration for receiving water droplets having fallen from respective upper condensation tubes 48 and directing received water droplets outwardly away from lower condensation tubes 48. Stated another way, when a drop strikes another tube 48, the drop spreads out and, when it spreads out, it decreases the condensing surface area on the stricken tube. This may be referred to as flooding. The shield member 54 prevents undesirable flooding so as to increase the condensing surface area on lower tubes 48. With more detail regarding the structure, each shield member 54 is coupled to a respective support rod 51*a*. As indicated above, a plurality of support frames 51 may be included and distributed along the plurality of condensation tubes 48. Further, it will be understood that each shield member 54 may have a laterally elongate configuration so as to provide a covering in the manner of a lid or a rail the entire length of a condensation tube 48 as shown particularly in FIG. 9*a*. Stated another way, a shield member 54 may be shaped like a long tent with the bottom edges as a furled flange.

In another critical aspect, the atmosphere water generator assembly 40 includes a vibration device mounted in said interior space of the housing 41 proximate the plurality of condensation tubes 48. Preferably, the vibration device is an acoustic device 70 such as a subwoofer configured to emit sound waves, i.e., sound signals having particular wavelengths. It has been shown that soundwaves of predetermined frequency or levels are most effective at dislodging condensed water droplets so as to increase the efficiency and rapidity of water collection in the collection tank 60. In this way, the vibration device acts as a catalyst. For example, actual testing has shown that frequencies consistent with music known as 1980*s* hard rock has resulted in production of 3.35 times as much water over the same amount of time. Alternatively, other vibration devices may be configured to generate equivalent frequencies, e.g., vibration motors that are appropriately programmed.

It is understood that while certain forms of this invention have been illustrated and described, it is not limited thereto except insofar as such limitations are included in the following claims and allowable functional equivalents thereof.

The invention claimed is:

1. An atmospheric water generation apparatus, comprising:
   a refrigeration unit including a casing defining an interior space and having a compressor configured to generate coolant when energized;
   a coolant reservoir including a coolant container defining an interior area in fluid communication with said refrigeration unit for receiving and containing said coolant,
   an atmospheric water generator (AWG) comprising a housing defining an interior area and having an inlet manifold positioned in said interior area of said housing and in fluid communication with said coolant container for receiving said coolant,
   said AWG having an outlet manifold displaced downstream from said inlet manifold and that includes an open interior area,
   a plurality of condensation tubes extending between said inlet manifold and said outlet manifold, each condensation tube configured to direct said coolant and a plurality of photons downstream from said inlet manifold toward said outlet manifold;
   a plurality of photon diverter assemblies each coupled to a respective downstream end of a respective condensation tube and extending through said outlet manifold;
   wherein each photon diverter assembly includes a lens configured to block said coolant and defines a top-side aperture configured to receive a fluid flow of said coolant into said outlet manifold.

2. The atmospheric water generation apparatus as in claim 1, wherein:
   said inlet manifold has a tubular configuration defining an interior void in fluid communication with said coolant container and with said plurality of condensation tubes; and
   said outlet manifold has a tubular configuration defining an interior void in fluid communication with said plurality of condensation tubes and with said coolant container.

3. The atmospheric water generation apparatus as in claim 2, wherein said top-side aperture of said each photon diverter assembly interfaces a channel of a respective condensation tube with said interior void of said outlet manifold.

4. The atmospheric water generation apparatus as in claim 1, wherein each said diverter assembly has a tubular configuration having a distal end extending away from said outlet manifold, said lens being positioned adjacent said distal end and having a transparent construction through which a photon is passed.

5. The atmospheric water generation apparatus as in claim 1, wherein each said diverter assembly has an offset configuration having a distal end extending at an angle away from said outlet manifold, said lens being positioned adjacent said distal end and having a transparent construction through which a photon is passed.

6. The atmospheric water generation apparatus as in claim 1, further comprising:
   a support frame positioned adjacent said inlet manifold, said support frame including a plurality of support rods extending between a pair of upstanding support legs, said plurality of support rods positioned were supporting said plurality of condensation tubes, respectively;
   a plurality of shield members coupled to said plurality of support rods and positioned adjacent said plurality of condensation tubes, respectively so that condensation falling from upper condensation tubes are shielded from impacting lower condensation tubes.

7. The atmospheric water generation apparatus as in claim 1, wherein said atmosphere water generator includes a water reservoir positioned beneath said plurality of condensation tubes, said water storage reservoir having a collection tray having an inclined lid defining an aperture or split such that condensation is allowed to fall through into a storage area.

8. The atmospheric water generation apparatus as in claim 1, wherein said atmosphere water generator defines at least one vent opening and includes at least one pull through fan configured to pull ambient air into said interior area of said housing when energized.

9. The atmospheric water generation apparatus as in claim 1, wherein said atmosphere water generator includes a vibration device mounted proximate said plurality of condensation tubes and configured to increase a rate of condensation when energized.

10. The atmospheric water generation apparatus as in claim 9, wherein said vibration device is an acoustic device that is operable to emit music signals when energized.

11. The atmospheric water generation apparatus as in claim 1, wherein said plurality of condensation tubes are each constructed of a non-metal material.

12. An atmospheric water generation apparatus, comprising:
a refrigeration unit including a casing defining an interior space and having a compressor configured to generate coolant when energized;
a coolant reservoir including a coolant container defining an interior area in fluid communication with said refrigeration unit for receiving and containing said coolant,
an atmospheric water generator (AWG) comprising a housing defining an interior area and having an inlet manifold positioned in said interior area of said housing and in fluid communication with said coolant container for receiving said coolant,
said AWG having an outlet manifold displaced downstream from said inlet manifold and that includes an open interior area,
a plurality of condensation tubes extending between said inlet manifold and said outlet manifold, each condensation tube configured to (1) generate condensation and a plurality of photons when said coolant is directed through said plurality of condensation tubes, respectively, and to (2) direct said coolant and a plurality of photons downstream from said inlet manifold toward said outlet manifold;
a plurality of photon diverter assemblies each coupled to a respective downstream end of a respective condensation tube and extending through said outlet manifold;
wherein each photon diverter assembly has (1) a closed distal end configured to block a fluid flow of said coolant and (2) defines a top-side aperture configured to receive said fluid flow of said coolant into said interior area of said outlet manifold when said fluid flow is blocked by said closed distal end;
wherein said plurality of condensation tubes is configured to generate condensation when said coolant is directed downstream therethrough, respectively;

an acoustic device in communication with said AWG that, when energized, is configured to emit radio signals indicative of music so as to increase a rate of said condensation generation.

13. The atmospheric water generation apparatus as in claim 12, wherein said acoustic device is a subwoofer that is configured to emit music signals when energized.

14. The atmospheric water generation apparatus as in claim 12, wherein each closed distal end of each photon diverter assembly includes a lens having a linear configuration that blocks passage of said fluid flow of said current and allows passage of plurality of photons.

15. The atmospheric water generation apparatus as in claim 12, wherein:
said inlet manifold has a tubular configuration defining an interior void in fluid communication with said coolant container and with said plurality of condensation tubes; and
said outlet manifold has a tubular configuration defining an interior void in fluid communication with said plurality of condensation tubes and with said coolant container.

16. The atmospheric water generation apparatus as in claim 12, wherein each said diverter assembly has an offset configuration having a distal end extending at an angle away from said outlet manifold, said lens being positioned adjacent said distal end and having a transparent construction through which a photon is passed.

17. The atmospheric water generation apparatus as in claim 14, wherein each said diverter assembly has an offset configuration having a distal end extending at an angle away from said outlet manifold such that said plurality of photons is deflected, said lens being positioned adjacent said distal end and having a transparent construction through which a photon is passed.

18. The atmospheric water generation apparatus as in claim 12, further comprising:
a support frame positioned adjacent said inlet manifold, said support frame including a plurality of support rods extending between a pair of upstanding support legs, said plurality of support rods positioned were supporting said plurality of condensation tubes, respectively;
a plurality of shield members coupled to said plurality of support rods and positioned adjacent said plurality of condensation tubes, respectively so that condensation falling from upper condensation tubes are shielded from impacting lower condensation tubes.

19. The atmospheric water generation apparatus as in claim 12, wherein said atmosphere water generator includes a water reservoir positioned beneath said plurality of condensation tubes, said water storage reservoir having a collection tray having an inclined lid defining an aperture or split through which condensation is allowed to fall into a storage area.

20. The atmospheric water generation apparatus as in claim 12, wherein said atmosphere water generator defines at least one vent opening and includes at least one pull through fan configured to pull ambient air into said interior area of said housing when energized.

* * * * *